(12) United States Patent
de la Fuente et al.

(10) Patent No.: US 10,755,029 B1
(45) Date of Patent: Aug. 25, 2020

(54) EVALUATING AND FORMATTING HANDWRITTEN INPUT IN A CELL OF A VIRTUAL CANVAS

(71) Applicant: QuirkLogic, Inc., Calgary (CA)

(72) Inventors: Alfonso Fabian de la Fuente, Victoria (CA); Michael Howatt Mabey, Calgary (CA)

(73) Assignee: QuirkLogic, Inc., Calgary (CA)

( * ) Notice: Subject to any disclaimer, the term of this patent is extended or adjusted under 35 U.S.C. 154(b) by 22 days.

(21) Appl. No.: 15/396,180

(22) Filed: Dec. 30, 2016

Related U.S. Application Data

(63) Continuation-in-part of application No. 15/173,275, filed on Jun. 3, 2016, now Pat. No. 10,324,618.

(60) Provisional application No. 62/275,052, filed on Jan. 5, 2016.

(51) Int. Cl.
*G06F 3/0488* (2013.01)
*G06F 40/103* (2020.01)
*G06F 40/171* (2020.01)

(52) U.S. Cl.
CPC ........ *G06F 40/103* (2020.01); *G06F 3/04883* (2013.01); *G06F 40/171* (2020.01)

(58) Field of Classification Search
CPC ......... G06F 3/0488; G06F 17/21; G06F 17/24
See application file for complete search history.

(56) References Cited

U.S. PATENT DOCUMENTS

| | | |
|---|---|---|
| 5,197,432 A | 3/1993 | Ballheimer |
| 5,523,775 A | 6/1996 | Capps |
| 5,548,705 A | 8/1996 | Moran et al. |
| 5,553,224 A | 9/1996 | Saund et al. |
| 5,784,504 A | 7/1998 | Anderson et al. |
| 5,850,477 A | 12/1998 | Takada |
| 5,889,523 A | 3/1999 | Wilcox et al. |
| 5,953,735 A | 9/1999 | Forcier |
| 6,411,733 B1 | 6/2002 | Saund |
| 6,651,221 B1 | 11/2003 | Thompson et al. |
| 6,687,876 B1 | 2/2004 | Schilit et al. |
| 7,136,082 B2 | 11/2006 | Saund et al. |

(Continued)

FOREIGN PATENT DOCUMENTS

| | | |
|---|---|---|
| JP | 2015-191487 A | 11/2015 |
| TW | 201443822 A | 11/2014 |

OTHER PUBLICATIONS

International Search Report issued in corresponding Application No. PCT/CA2017/051330, dated Feb. 12, 2018 (3 pages).

(Continued)

*Primary Examiner* — Andrea C Leggett

(74) *Attorney, Agent, or Firm* — Chamberlain, Hrdlicka, White, Williams & Aughtry

(57) ABSTRACT

A method and non-transitory computer readable medium for formatting handwritten virtual ink. The method includes receiving handwritten input on an interactive display, the handwritten input including a plurality of strokes; associating a cell of a virtual canvas displayed on the interactive display with the handwritten input; making a determination that the handwritten input does not fit entirely within the cell; making a determination that at least a portion of the handwritten input is within a tolerance area associated with the cell; and applying a cell formatting decision to the portion of the handwritten input within the tolerance area.

31 Claims, 15 Drawing Sheets

(56) References Cited

U.S. PATENT DOCUMENTS

| | | |
|---|---|---|
| 7,203,903 B1 | 4/2007 | Thompson et al. |
| 7,218,779 B2 | 5/2007 | Dodge et al. |
| 7,305,630 B2 | 12/2007 | Hullender et al. |
| 8,090,366 B2 | 1/2012 | McNamara et al. |
| 8,473,851 B2 | 6/2013 | DeGrazia |
| 8,826,147 B2 | 9/2014 | Sitrick et al. |
| 8,988,375 B2 | 3/2015 | Aizawa |
| 9,575,712 B2 | 2/2017 | Farouki |
| 9,740,361 B2 | 8/2017 | Tan et al. |
| 9,904,465 B2 | 2/2018 | Angelov et al. |
| 2001/0043743 A1 | 11/2001 | Sakaguchi et al. |
| 2002/0157880 A1 | 10/2002 | Atwood et al. |
| 2003/0007683 A1 | 1/2003 | Wang et al. |
| 2003/0179214 A1 | 9/2003 | Saund et al. |
| 2004/0141648 A1 | 7/2004 | Dodge et al. |
| 2005/0091289 A1 | 4/2005 | Shappell et al. |
| 2005/0149856 A1 | 7/2005 | Rimas et al. |
| 2005/0198591 A1 | 9/2005 | Jarrett et al. |
| 2005/0248545 A1* | 11/2005 | Nishimura ............ G06F 1/1626 345/173 |
| 2006/0028457 A1 | 2/2006 | Burns |
| 2006/0257025 A1 | 11/2006 | Simmons et al. |
| 2006/0274057 A1 | 12/2006 | Van Ness et al. |
| 2007/0044028 A1 | 2/2007 | Dunn et al. |
| 2007/0124737 A1 | 5/2007 | Wensley et al. |
| 2008/0046372 A1 | 2/2008 | Lutnick et al. |
| 2008/0114844 A1 | 5/2008 | Sanchez et al. |
| 2008/0123976 A1 | 5/2008 | Coombs et al. |
| 2008/0231635 A1 | 9/2008 | Saund |
| 2009/0019113 A1 | 1/2009 | Wu et al. |
| 2009/0024918 A1 | 1/2009 | Silverbrook et al. |
| 2009/0106093 A1 | 4/2009 | Folgner et al. |
| 2009/0217177 A1* | 8/2009 | DeGrazia ............. G06F 3/0481 715/753 |
| 2009/0273585 A1 | 11/2009 | De Haan et al. |
| 2010/0257239 A1 | 10/2010 | Roberts |
| 2010/0325559 A1 | 12/2010 | Westerinen et al. |
| 2012/0131113 A1 | 5/2012 | Chen et al. |
| 2012/0206330 A1 | 8/2012 | Cao et al. |
| 2012/0254773 A1 | 10/2012 | Viswanathan |
| 2013/0091209 A1 | 4/2013 | Bennett et al. |
| 2013/0091440 A1 | 4/2013 | Kotler et al. |
| 2013/0321340 A1 | 12/2013 | Seo et al. |
| 2014/0111416 A1* | 4/2014 | Sugiura ............... G06F 3/04883 345/156 |
| 2014/0222916 A1 | 8/2014 | Foley et al. |
| 2014/0258901 A1 | 9/2014 | Cho |
| 2014/0334732 A1* | 11/2014 | Jung .................. G06F 3/04883 382/188 |
| 2014/0344053 A1 | 11/2014 | Yang et al. |
| 2015/0058753 A1 | 2/2015 | Anderson et al. |
| 2015/0109546 A1 | 4/2015 | Tai et al. |
| 2015/0116367 A1 | 4/2015 | Yada |
| 2015/0146985 A1 | 5/2015 | Nakasu et al. |
| 2015/0154442 A1 | 6/2015 | Takahashi et al. |
| 2015/0248740 A1 | 9/2015 | Gormish et al. |
| 2015/0269033 A1 | 9/2015 | Bailor et al. |
| 2015/0371417 A1 | 12/2015 | Angelov et al. |
| 2016/0048318 A1 | 2/2016 | Markiewicz |
| 2016/0070462 A1 | 3/2016 | Baudry et al. |
| 2016/0154579 A1* | 6/2016 | Lee .................... G06F 3/04883 382/189 |
| 2016/0328145 A1 | 11/2016 | Petkov et al. |
| 2016/0328624 A1 | 11/2016 | Angelov et al. |
| 2017/0109578 A1 | 4/2017 | Bednarowicz et al. |
| 2018/0004407 A1 | 1/2018 | Angelov et al. |
| 2018/0203599 A1 | 7/2018 | Angelov et al. |

OTHER PUBLICATIONS

Written Opinion issued in corresponding Application No. PCT/CA2017/051330, dated Feb. 12, 2018 (7 pages).

Examination Notification issued in corresponding Taiwan Application No. 103107055, dated Jan. 10, 2018 (23 pages).

Surface Pro 3 User Guide With Windows 8.1 Pro; Microsoft; Version 1.0; Jun. 2014.

* cited by examiner

EVALUATING AND FORMATTING HANDWRITTEN INPUT IN A CELL OF A VIRTUAL CANVAS

CROSS REFERENCE TO RELATED APPLICATIONS

This patent application is a continuation-in-part (CIP) of U.S. patent application Ser. No. 15/173,275 filed on Jun. 3, 2016. Accordingly, this patent application claims benefit of U.S. patent application Ser. No. 15/173,275 under 35 U.S.C. § 120. U.S. patent application Ser. No. 15/173,275 is incorporated herein by reference in its entirety. This application also claims priority to U.S. Provisional Application No. 62/275,052 filed on Jan. 5, 2016. U.S. Provisional Application No. 62/275,052 is hereby incorporated by reference in its entirety.

BACKGROUND

Flipcharts have not changed significantly over 100 years. And to this day it is very common for any meeting room to have some form of a flipchart for writing notes or sharing ideas. Use of the flipchart has been augmented by blackboards and/or whiteboards for presenting information. These tools continue to thrive in the office environment despite the introduction of digital projectors, interactive displays, laptops, and mobile phone technology. Whiteboards and flipcharts are advantageous because they are transparent to users, they are easy to set up and use, and have no technological barriers. Although technology has now advanced in the office environment, whiteboards and flipcharts are fundamentally unchanged.

SUMMARY

In general, in one aspect, embodiments of the invention relate to a method for formatting handwritten virtual ink. The method includes receiving handwritten input on an interactive display, the handwritten input including a plurality of strokes; associating a cell of a virtual canvas displayed on the interactive display with the handwritten input; making a determination that the handwritten input does not fit entirely within the cell; making a determination that at least a portion of the handwritten input is within a tolerance area associated with the cell; and applying a cell formatting decision to the portion of the handwritten input within the tolerance area.

In general, in one aspect, embodiments of the invention relate to a non-transitory computer readable medium including instructions, which when executed by a processor, perform a method for formatting handwritten virtual ink. The method includes receiving handwritten input on an interactive display, the handwritten input including a plurality of strokes; associating a cell of a virtual canvas displayed on the interactive display with the handwritten input; making a determination that the handwritten input does not fit entirely within the cell; making a determination that at least a portion of the handwritten input is within a tolerance area associated with the cell; applying a cell formatting decision to the portion of the handwritten input within the tolerance area.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art and having the benefit of this Detailed Disclosure that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-14, any components described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for formatting handwritten input (e.g., handwritten virtual ink) received on an interactive display.

Specifically, embodiments of the invention are directed to an interactive display that displays a virtual canvas that includes one or more cells, and to receiving handwritten input at least partially within at least one of the one or more cells. More specifically, embodiments of the invention are related to applying cell formatting decisions to the received handwritten input.

Figure 1A:
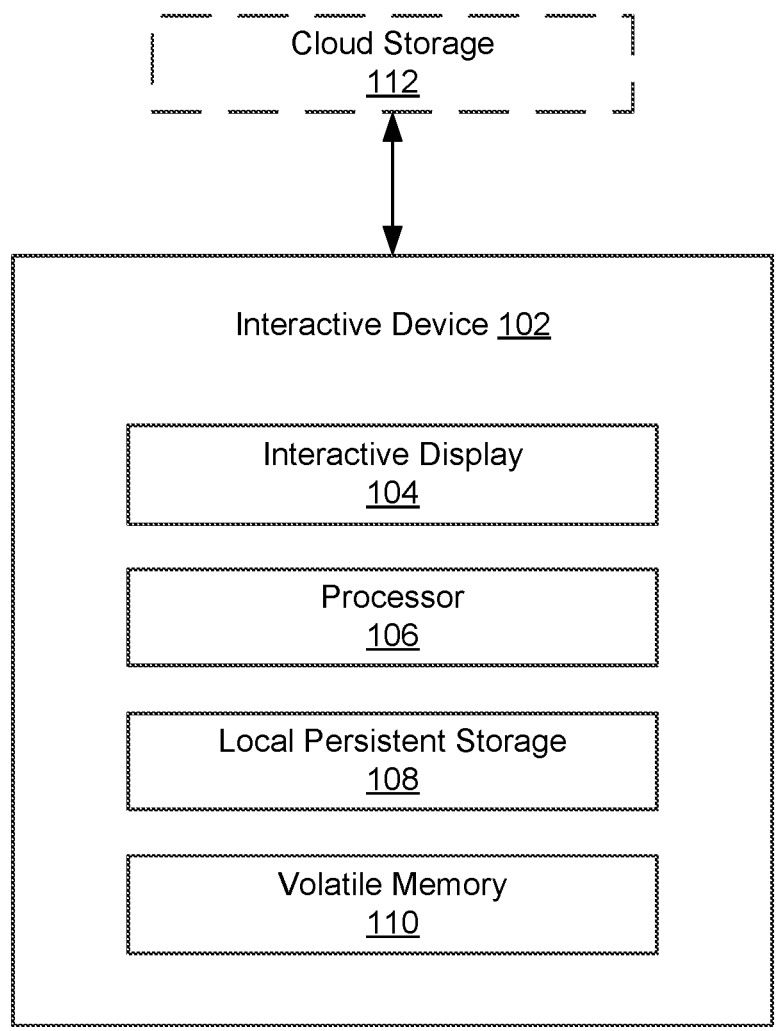
FIG. 1A shows a system in accordance with one or more embodiments of the invention.

FIG. 1A shows a system in accordance with one or more embodiments of the invention. The system includes an interactive device (102). Each component of the interactive device (102) is described below.

In one or more embodiments of the invention, the interactive device (102) is any physical system with an interactive display (104), a processor (106), local persistent storage (108), and volatile memory (110). Further, the interactive device (102) may be operatively connected to cloud (or remote) storage (112) in a cloud computing environment. In one or more embodiments of the invention, the interactive device (102) may be any interactive device capable of receiving input, such as a reflective display device, an interactive whiteboard, an electronic tablet, or any other suitable device. For example, the interactive device (102) may be an e-flipchart apparatus as described in FIG. 1B.

In one or more embodiments of the invention, the interactive device (102) includes functionality to receive at least one stroke input (not shown) on the interactive display (104). The interactive device (102) may also include functionality to process, using the processor (106), the stroke input (described below) as stroke data (described below). Furthermore, in one or more embodiments of the invention, the interactive device (102) is configured to categorize the stroke data based on an object type and to create object groups, using a proximity threshold and a time threshold, as further discussed below. Additionally, in one or more embodiments of the invention, the interactive device (102) is configured to store the stroke data in the volatile memory (110), local persistent storage (108), and/or cloud storage (112) associated with the interactive device (102).

In one or more embodiments of the invention, the interactive display (104) is a user interface with a display screen (e.g., for displaying a virtual canvas). In one or more embodiments of the invention, the display screen may display a virtual canvas (not shown) that includes one or more cells (discussed further in the description of FIG. 2, below) The display screen may be a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., a video projector, a flap display, a flip disk display, a digital micromirror device (DMD), an interferometric modulator display (IMOD), an uni-pixel display (FTIR), and a telescopic pixel display)

In one or more embodiments of the invention, the interactive display (104) includes a touch-sensitive portion that is capable of receiving and displaying stroke input. In one or more embodiments of the invention, the stroke input, displayed by the interactive display (104), may be any digital pixel or marking made by touch input on the touch-sensitive portion of the interactive display (104), or by input on the interactive display (104) via a digital marker. For example, the stroke input may be a dot, a line, a letter, a drawing, a word, or a series of words made on the interactive display (104) using a digital marker, stylus pen, or user touch input. In one or more embodiments of the invention, stroke input is input that is handwritten by a user and received via the interactive display (i.e., handwritten input).

As previously mentioned, in one or more embodiments of the invention, the stroke input is processed into stroke data, by the processor (106) and stored on the interactive device (102). The stroke data may be initially stored in the volatile memory (110), in accordance with the embodiments shown in FIG. 13. Volatile memory (110) may be any volatile memory including, but not limited to, Dynamic Random-Access Memory (DRAM), Synchronous DRAM, SDR SDRAM, and DDR SDRAM. Additionally, the interactive device (102) may store the stroke data in the local persistent storage (108) of the interactive device (102). Local persistent storage (108) may be, for example, solid state memory, optical storage, magnetic storage, or any other medium capable of persistently storing data. Further, the stroke data may optionally be stored on remote persistent storage or in a cloud computing environment having cloud storage (112), such as a web-based storage environment.

In one or more embodiments of the invention, the stroke data may include, but is not limited to, location data for the stroke (e.g., the x, y, coordinates of the detected locations of the stroke input), optional stroke pressure data for the stroke (e.g., the amount of pressure that was detected at each location point), stroke characteristics that can be used to render the stroke from the location data and optional pressure data (e.g., stroke line width, stroke type (e.g., pen, pencil, marker), stroke color), a timestamp associated with the stroke input, a user that produced the stroke (e.g., the user that used a stylus to draw a line on the interactive device), the type of input that was used to generate the stroke input (e.g., stylus, finger(s), etc.), information about the stylus (if a stylus was used) (e.g., the width of the tip of the stylus, etc.). In one or more embodiments of the invention, the stroke data may include the location of the pixels that are changed as a result of the stroke (e.g., the pixels that make up the line(s) and/or curve(s) that were created as a result of the stroke input). In one or more embodiments of the invention, stroke data may include location data for the location of stroke input sampled periodically or aperiodically, with the processor (106) including functionality to determine additional stroke data based, at least in part, on a proximity relationship and/or a temporal relationship between any two or more samples.

While FIG. 1A shows a configuration of components, system configurations other than those shown in FIG. 1A may be used without departing from the scope of the invention. For example, various components may be combined to create a single component. As another example, the functionality performed by a single component may be performed by two or more components. In one or more embodiments of the invention, one or more of the modules and elements shown in FIG. 1A may be omitted, repeated, and/or substituted. Accordingly, embodiments of the invention should not be considered limited to the specific arrangements of modules and elements shown in FIG. 1A.

Figure 1B:
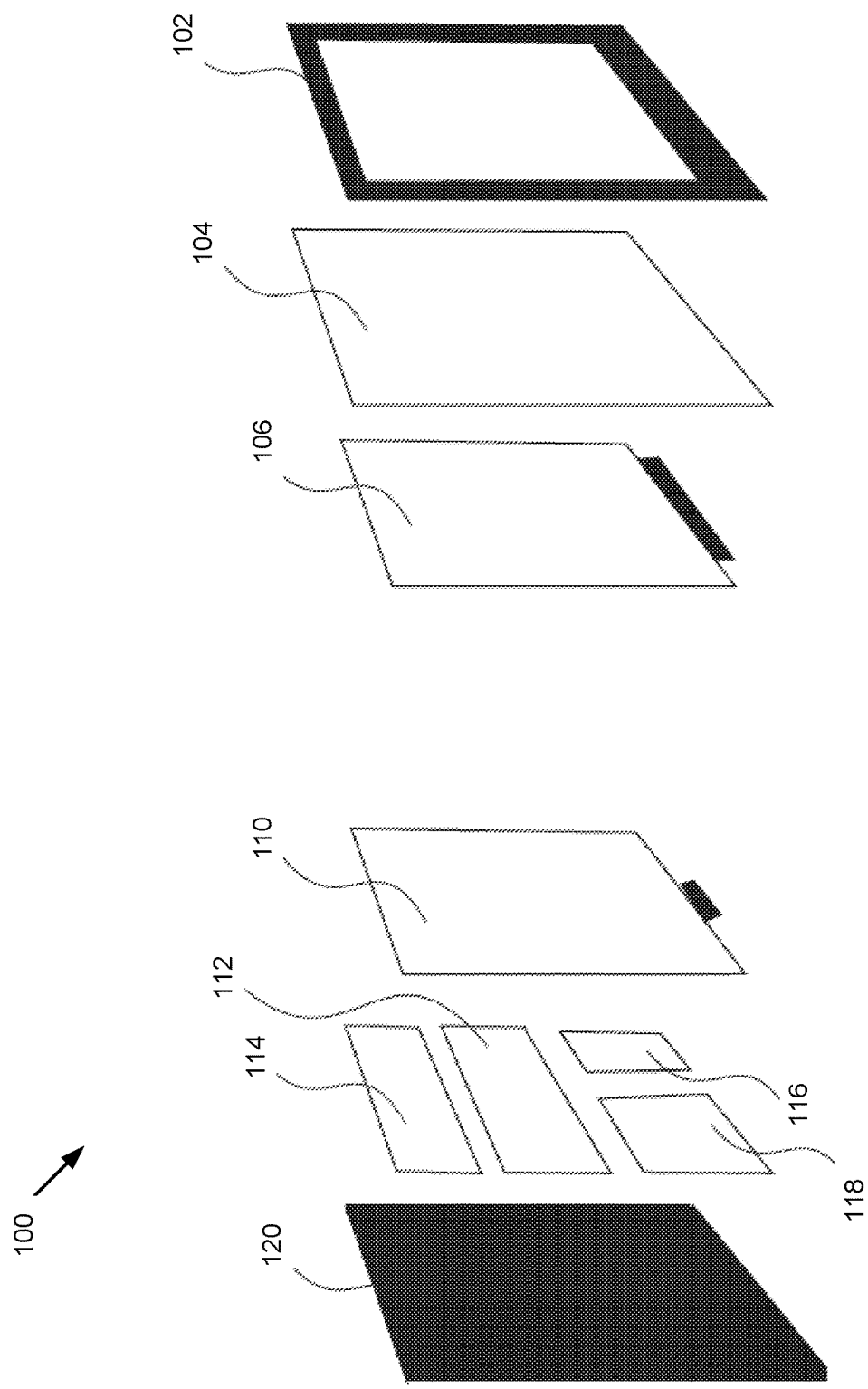
FIG. 1B shows an apparatus in accordance with one or more embodiments of the invention.

FIG. 1B shows a schematic diagram of an apparatus of an e-flipchart (also referred to as an e-flipchart apparatus) in accordance with one or more embodiments of the invention.

Turning to FIG. 1B, in accordance with one or more embodiments of the invention, the apparatus (100) may include one or more hardware elements, each having certain functionality. The main structure of the e-flipchart apparatus may be formed between a back panel (120) and a front frame (102). In one or more embodiments of the invention, the front frame is a clear, opaque, or translucent material and includes an active area on which content may be displayed.

In one or more embodiments of the invention, the back panel (120) is a rigid mechanical support structure made of a solid material, for example, plastic or metal.

In one or more embodiments of the invention, in between the back panel (120) and the front frame (102) is a display (106). In one embodiment of the invention, the display (106) may be viewed as an output device that, through reflection, harnesses ambient light in order to present content. For example, the display (106) may host slow refresh rates, monochromatic coloring (e.g., black and white, or gray scale shading), and the presentation of low contrasting definition. However, on the other hand, the display (106) may have one or more of the following features: (i) very low power consumption; (ii) the readability of content outdoors under sunlight; and (iii) the providing of strain relief on the eyes of a user. As such, in one or more embodiments of the invention, fundamental static digital media, such as monochromatic text and still images, may be delegated to a display (106) for presentation. Examples of a display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the reflective display (106) of the e-flipchart apparatus may be bi-stable. In one embodiment of the invention, the reflective display may correspond to the reflective displayed described in U.S. Pat. No. 5,930,026. The invention is not limited to the reflective display described in the above-referenced patent.

Continuing with the discussion of FIG. 1B, in one or more embodiments of the invention, in front of the display (106) is a layer having at least one touch portion which may be a transparent rigid or semi-rigid board (104), or a frame that uses edge sensors, such as Infra-red or optical sensing technology. In another embodiment of the invention, the layer having at least one touch portion (104) may be a capacitive film layer. In one or more embodiments of the invention, the layer having at least one touch portion (104) may only cover a portion of the display, with the remaining surface area of the display (106) being covered by non-touch sensitive material which may or may not be clear, opaque, translucent, transparent and/or non-transparent. In the back of the display (106) may be an optional electromagnetic layer, which may be an electromagnetic board (110). By combining the electromagnetic layer (110) and the layer having at least one touch portion (104), at least a dual system for touch input may be obtained. In one or more embodiments of the invention, touch input may include a finger(s) and/or a touch by a digital marker or digitizer.

In one or more embodiments of the invention, the electromagnetic layer (110) is configured to generate an electromagnetic field capable of detecting a digital marker or digitizer when such a tool is used to provide an input to the e-flipchart. The electromagnetic layer (110) may include wires (not shown) that allow the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) may be configured to respond to each detected input type. For example, detecting a digital marker input may result in a line being drawn on the display, while touching the same area with a finger may pan or zoom the display area. In one or more embodiments of the invention, a virtual canvas (not shown) may be displayed, at least in part, using any one or more of the front frame (102), the touch portion (104), the display (106), and the electromagnetic layer (110).

Continuing with FIG. 1B, controller (114) may include hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof. Volatile memory may include RAM, DRAM, or any combination thereof. In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality, such as display of a virtual canvas.

The controller (including components therein) (114) may be powered by a battery and/or a power supply (112). In one or more embodiments of the invention, the controller (114) is configured to detect and process input signals. For example, when an object touches the layer having at least one touch portion (104), a signal is sent to the controller (114) for detection of the input type and processing of the input. Further, the controller may be configured to store (e.g., in persistent storage and/or volatile memory) each stroke (in the form of touch input or digital marker), or any portion of a stroke, after such an action is performed on the e-flipchart (100). In other words, the controller (114) may be configured to store data related to each stroke or action as it is produced in the active area of the front frame (102) of the e-flipchart apparatus (100).

Figure 5:
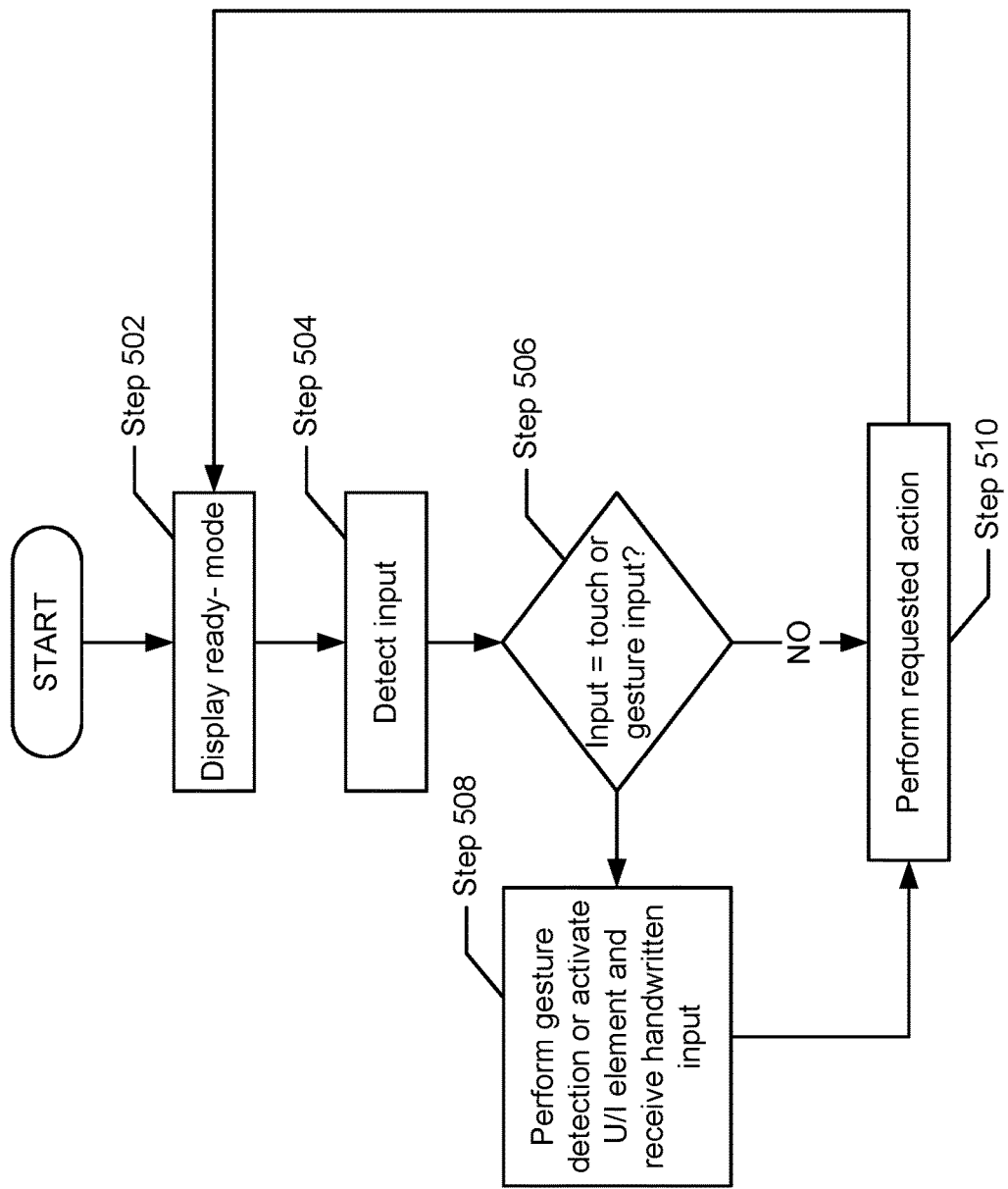
FIG. 5 shows a flowchart in accordance with one or more embodiments of the invention.
Figure 7:
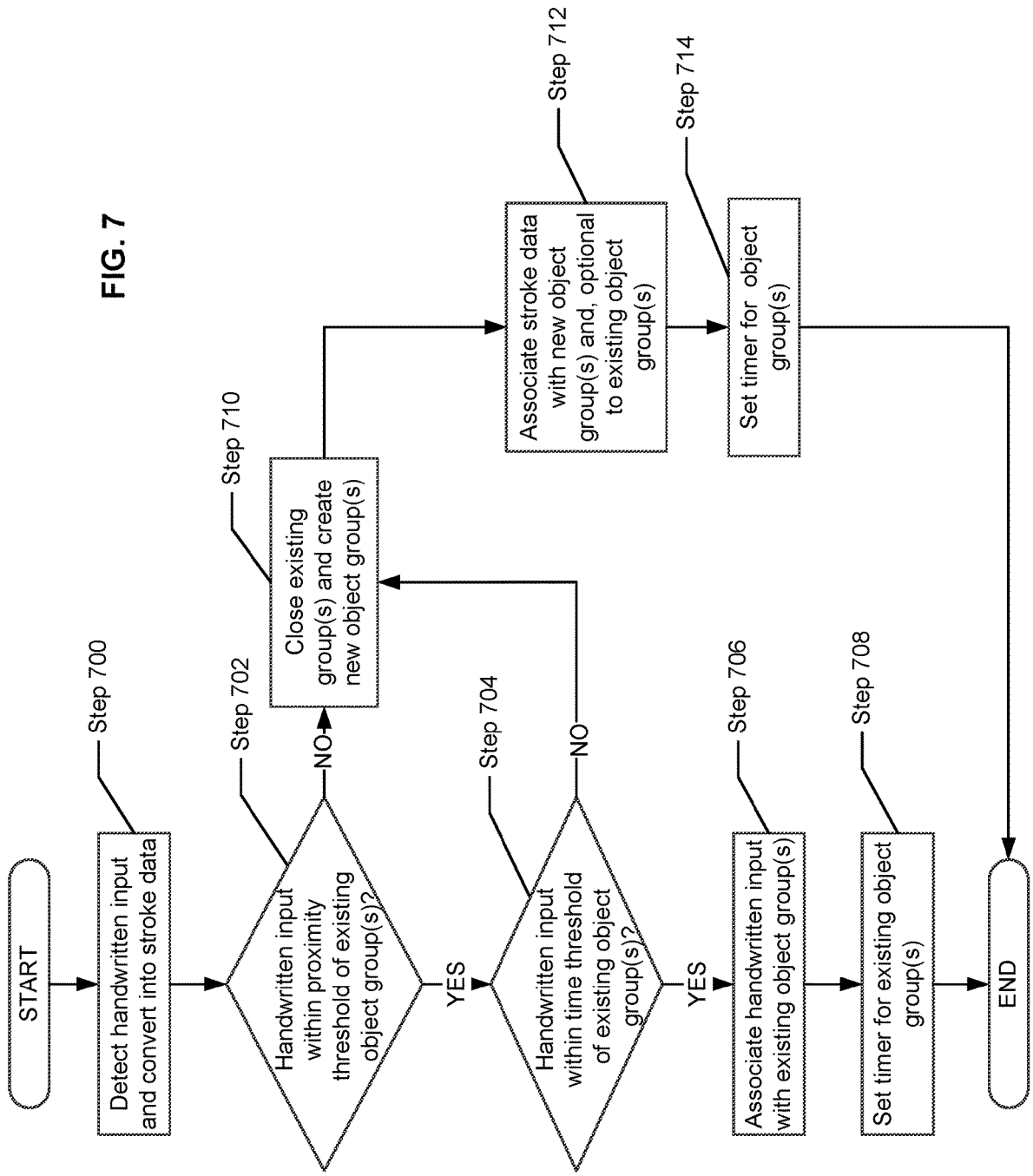
FIG. 7 shows a flowchart in accordance with one or more embodiments of the invention.
Figure 8:
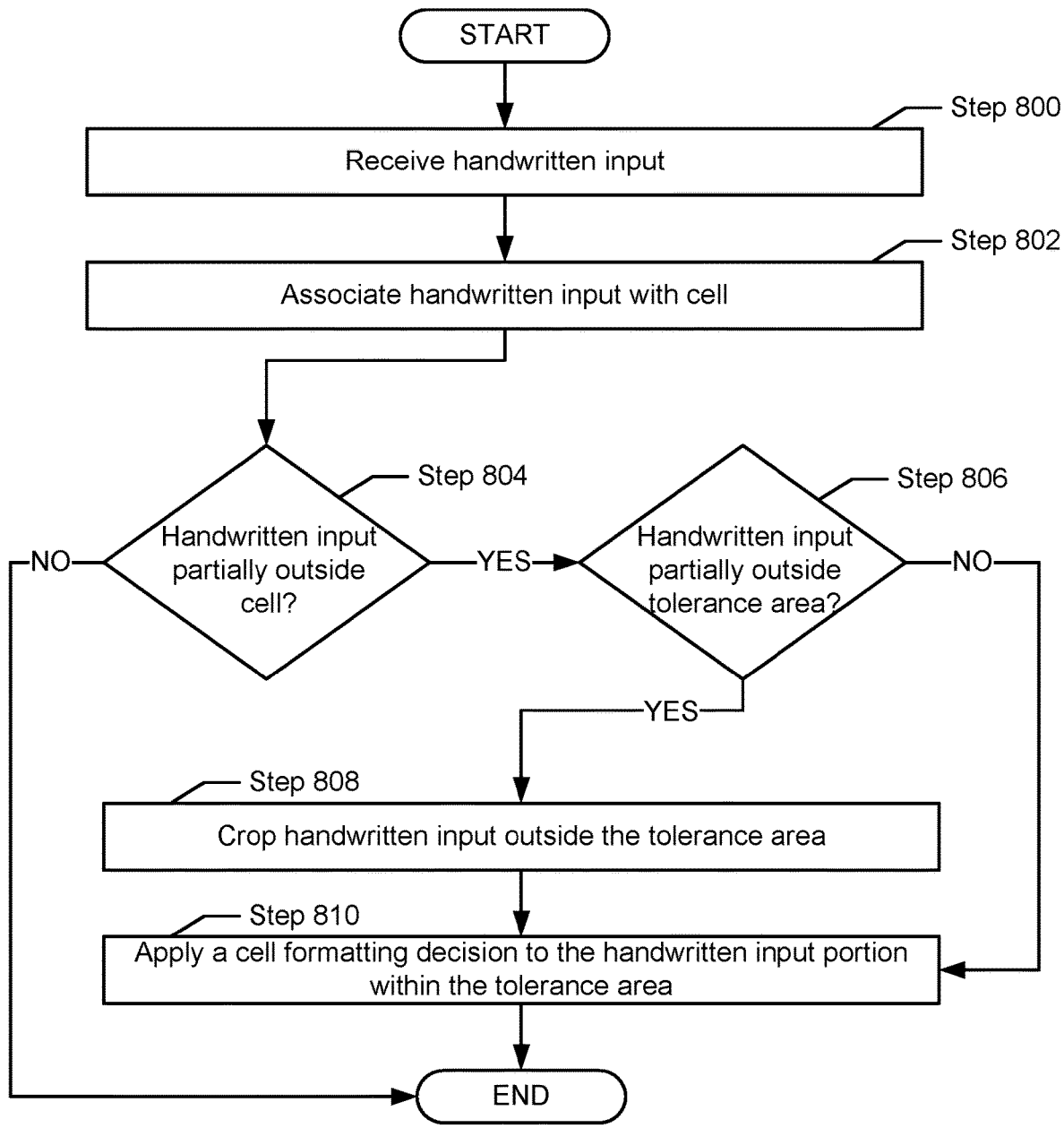
FIG. 8 shows a flowchart in accordance with one or more embodiments of the invention.

In one or more embodiments of the invention, the controller (114) includes functionality to implement the methods shown and described in FIGS. 5, 7, and 8. Further, while the controller (114) has been described as a combination of hardware and software, the controller may be implemented entirely within hardware without departing from the scope of the invention.

In one or more embodiments of the invention, the e-flipchart may include one or more external communication interfaces (116). The communication interfaces may permit the e-flipchart to interface with external components. For example, the communication interfaces may implement any communication protocol, such as Bluetooth, IEEE 802.11, USB, etc. The invention is not limited to the aforementioned communication protocols.

In one or more embodiments of the invention, the apparatus (100) of FIG. 1B is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus may be configured to change from the low power state to an active state.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes may be minimized, scan rate of finger and pen inputs may be delayed and overall power consumption of the components in the e-flipchart apparatus may be reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input may be performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the reflective display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the reflective display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1B, the e-flipchart apparatus may include a camera for detecting certain types of input (e.g., a gesture interpretation).

In one or more embodiments of the invention, the e-flipchart is configured to enable a user to create, modify, store, and share an e-presentation.

In one or more embodiments of the invention, the apparatus (100) of FIG. 1B is approximately 42 inches in diagonal with a 3:4 aspect ratio. Those skilled in the art and having the benefit of this Detailed Disclosure will appreciate that the size of the e-flipchart apparatus is designed to mimic that of a typical paper flipchart; however, the dimensions and size of the reflective display apparatus of FIG. 1B may vary without departing from the scope of the invention. For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1B shows a configuration of components, other configurations may be used without departing from the scope of the invention. For example, various components may be combined to create a single component. As another example, the functionality performed by a single component may be performed by two or more components. For example, while FIG. 1B describes an e-flipchart with a series of components organized in particular manner, those skilled in the art and having the benefit of this Detailed Disclosure will appreciate that the location of such various components in the e-flipchart, in particular, the reflective display (106), the layer having at least one touch portion (104), and the optional electromagnetic layer (110) may be arranged in different order without departing from the invention.

Figure 2:
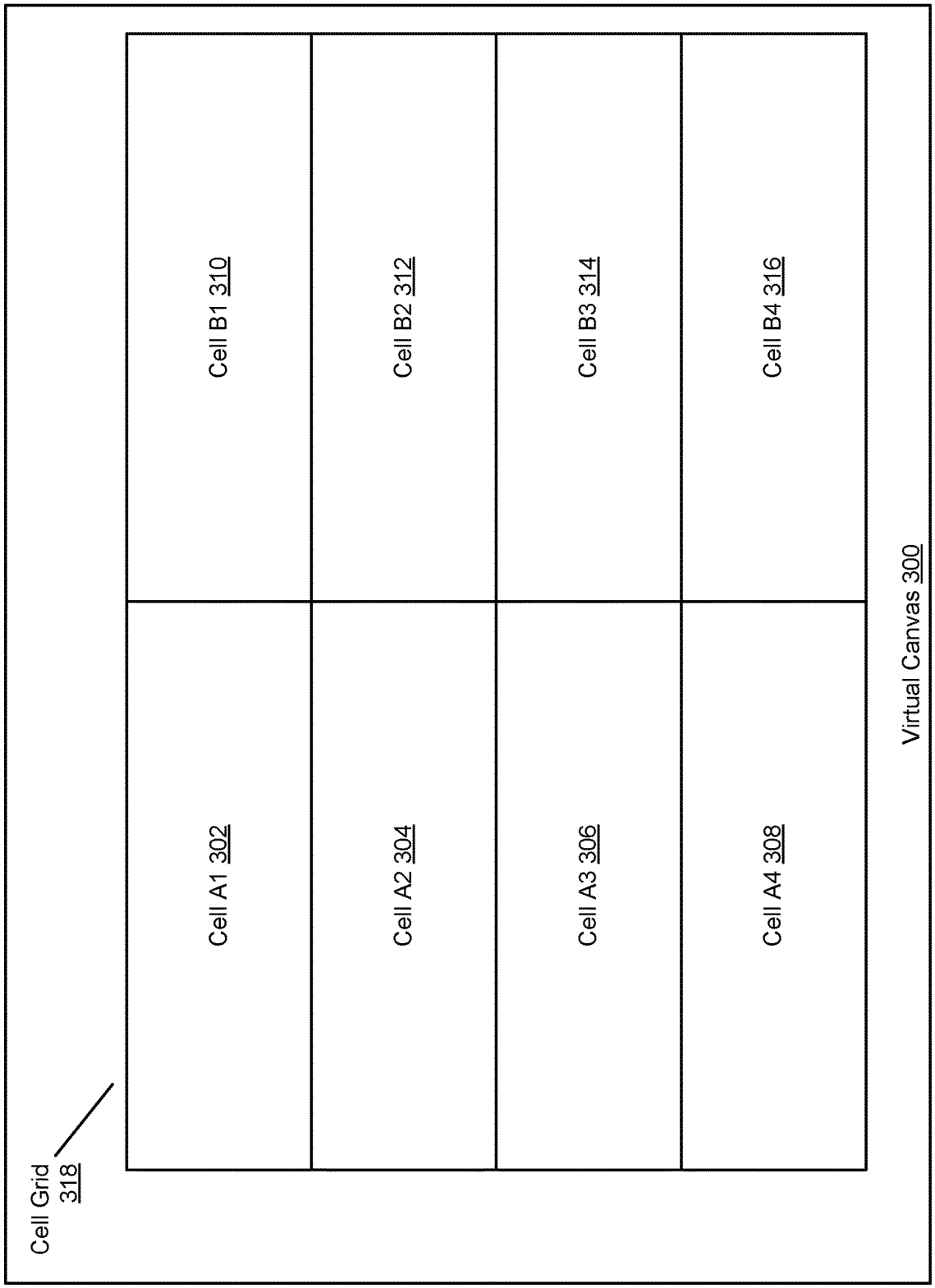
FIG. 2 shows a cell grid of a virtual canvas in accordance with one or more embodiments of the invention.

FIG. 2 shows a cell grid of a virtual canvas in accordance with one or more embodiments of the invention. As shown in FIG. 2, the virtual canvas (300) includes a cell grid (318), which may include any number of cells, such as cells A1-A4 (302-308) and cells B1-B4 (310-316). Each of these components is described below.

In one or more embodiments of the invention, a virtual canvas is a file used for displaying information that is viewed via an interactive display (e.g., interactive display (104) of FIG. 1). In one or more embodiments of the invention, the virtual canvas (300) may be a file, and may be stored in persistent storage ((e.g., local persistent storage (108) and/or cloud storage (112) of FIG. 1)), volatile memory (e.g., volatile memory (110) of FIG. 1), or any combination thereof, and may be displayed based at least in part on instructions executed by a processor (e.g., processor (106) of FIG. 1) and/or controller. For example, the virtual canvas may be a file stored in local persistent storage, and portions of the file may be copied into volatile memory, at least temporarily, by the processor. The processor may then process instructions to display the contents of the file on an interactive display of an interactive device. In one or more embodiments of the invention, content objects associated with the virtual canvas file may be the text and/or image data that is included in the file. The file in its entirety, including all of the data in the file, is what is known as the virtual canvas.

As shown in FIG. 2, in one or more embodiments of the invention, all or a portion of data associated with the virtual canvas (300) file may be displayed on the interactive display in one or more cells (302-316). In one or more embodiments of the invention, a cell is any portion of a virtual canvas (300), and cells may be arranged in any manner. For example, the cells (302-316) of FIG. 2 are arranged as a cell grid (318). However, one of ordinary skill in the art and having the benefit of this Detailed Disclosure will appreciate that the cells may be arranged in different manners, may or may not be adjacent to one another, and may vary in size and/or shape collectively and/or individually. For example, the cells of the virtual canvas may be the boxes of a flowchart. In one or more embodiments of the invention, a cell provides a boundary that represents a subdivision of the displayed virtual canvas (300) into which handwritten input may be received. In one or more embodiments of the invention, although the cells (302-316) of the cell grid (318) are shown designated via a letter-number combination (e.g., A1), any designation scheme may be used without departing from the scope of the invention. The designations corresponding to the cells may or may not be displayed on the virtual canvas.

Figure 3:
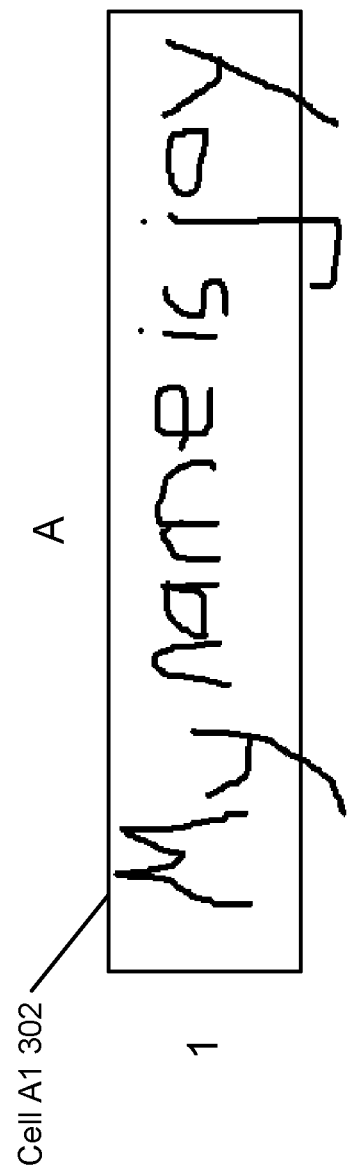
FIG. 3 shows a cell of a cell grid on an interactive display in accordance with one or more embodiments of the invention.

FIG. 3 shows an example of a single cell A1 (302) that includes the handwritten input "My name is joy" in accordance with one or more embodiments of the invention. As used herein, handwritten input refers to stroke input received in any manner (e.g., via stylus, via touch, via gesture, etc.) that is handwritten (e.g., by a user of the interactive device (102)) onto the virtual canvas (300) at least partially within at least one cell of the virtual canvas (300). In one or more embodiments of the invention, the stroke input may include any number of "strokes" of handwritten input, and may be processed to create stroke data, which may or may not be included in or associated with a virtual canvas file. In one or more embodiments of the invention, the stroke data corresponding to the handwritten input may be used to create one or more object groups, which may be associated with one or more object types. The relationship of stroke data, object groups, and object types is discussed further in the description of FIG. 6, below.

In one or more embodiments of the invention, the handwritten input, instead of being used to create one or more object groups, may be a set of stroke data that is received on a virtual canvas within certain time and or space relationship limits. For example, the interactive display may be sampled every four milliseconds to determine if there is any handwritten input being received via the virtual canvas, and if the handwritten input sampled is close enough together in space and time, then it is used to create a given set of stroke data. In one or more embodiments of the invention, handwritten input refers to a unit of input to an interactive display, or any portion thereof, which is associated with a cell. Association of handwritten input to a cell is discussed further in the description of FIG. 9, below.

In one or more embodiments of the invention, the handwritten input is stored in persistent storage and/or volatile memory. In one or more embodiments of the invention, the handwritten input stroke data may be used to recreate a representation of the handwritten input that is substantially similar to the original handwritten input, before or after any cell formatting decisions (discussed below) are applied. In one or more embodiments of the invention, the handwritten input is optionally converted into a format (e.g., American Standard Code for Information Interchange (ASCII)) and stored as metadata. In such embodiments of the invention, the converted handwritten input may be used to allow various types of additional functionality, such as the ability to search for text within handwritten input to a virtual canvas.

Figure 4:
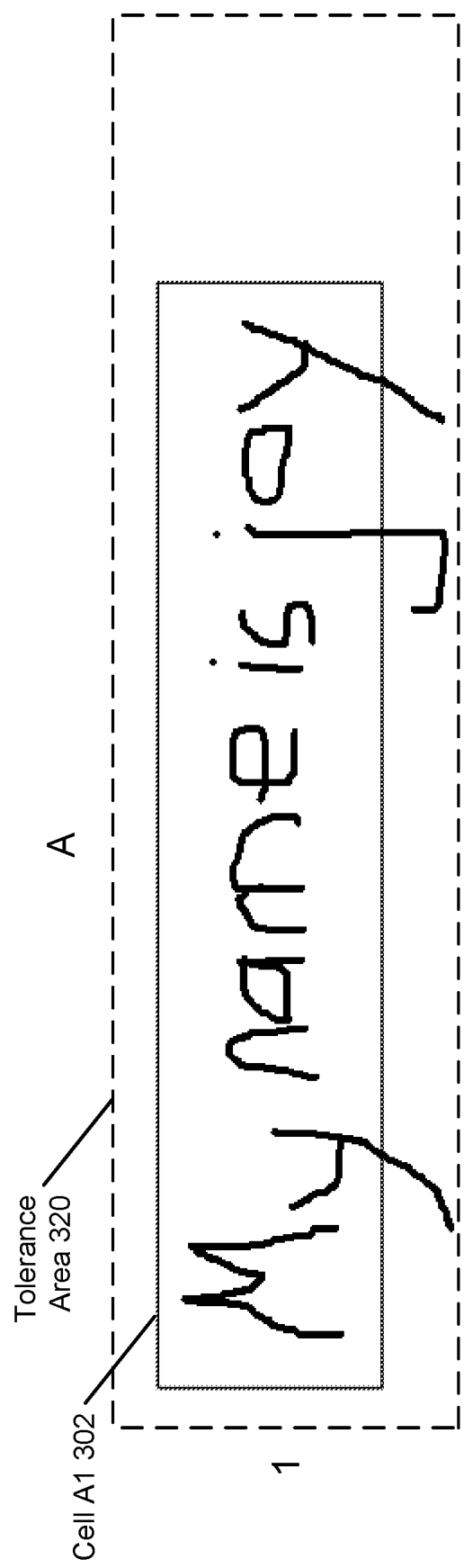
FIG. 4 shows a tolerance area associated with a cell in accordance with one or more embodiments of the invention.

FIG. 4 shows a cell and an associated tolerance area in accordance with one or more embodiments of the invention. As shown in FIG. 4, cell A1 (302) is associated with a tolerance area (320). In one or more embodiments of the invention, a tolerance area (320) is an area of any size or shape that encompasses a cell (e.g., cell A1 (302)). In one or more embodiments of the invention, a tolerance area (320) defines a region of a virtual canvas (e.g., virtual canvas (300) of FIG. 2) surrounding a cell within which handwritten input is received and may be subjected to one or more cell formatting decisions. In one or more embodiments of the invention, the size of the tolerance area is preset and may be customizable (e.g., by a user). In one or more embodiments of the invention, the tolerance area is defined, at least in part, based on a language selection (discussed further in the description of FIG. 14, below).

In one or more embodiments of the invention, a cell formatting decision may be any decision related to manipulation (i.e., modification of appearance) of handwritten input received within a tolerance area (300), and may be executed by a processor and/or controller of an interactive device. In one or more embodiments of the invention, a cell formatting decision is made based on a pre-determined configuration of the virtual canvas file that includes instructions related to a variety of cell formatting decisions. In one or more embodiments of the invention, cell formatting decisions may be configured by a user of an interactive device. Such configuration may include selecting from a variety of possible cell formatting decisions available on the virtual canvas.

Examples of possible cell formatting decisions include, but are not limited to: increasing the size of a cell in any one or more directions such that the portion of the handwritten input within the tolerance area associated with the cell is encompassed within the cell; reducing the size of the handwritten input within the tolerance area such that the handwritten input fits within the cell; dividing the handwritten input into two or more portions, each less than the width of the cell, and moving the second or more portions below the first portion; extending the height of a cell to display any moved portions of the handwritten input; hiding any moved portions of the handwritten input that are beyond the original cell boundaries; displaying handwritten input within the cell while hiding the remainder of the handwritten input that is outside the cell but inside the tolerance area; retaining the handwritten input within the tolerance area as input; adjusting a visual property of the handwritten input within the tolerance area to differentiate the handwritten input from existing or future additional handwritten input of another cell, which may or may not be an adjacent cell; and/or any combination of two or more of the aforementioned cell formatting decision examples.

Examples of adjusting a visual property of handwritten input include, but are not limited to: adjusting the greyscale of the handwritten input; adjusting the line width (e.g., of one or more strokes) of the handwritten input; adjusting the background color of the handwritten input; adjusting any other characteristic of the handwritten input; and/or adjusting any other property or combination of properties of either the cell, the tolerance area, or the handwritten input.

FIG. 5 shows a flowchart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 502, the interactive display is in display ready-mode. As described above, the interactive device (e.g., e-flipchart apparatus) may be always "on," and therefore, ready for use when a user walks up to the device or provides another type of input that is detected by the device (Step 504). Specifically, in the ready-mode (or base state), the interactive device polls for an input at a low frequency or input scan rate. In this mode, the display area of the interactive device may include the image from the last time it was fully active. When an input is detected, the interactive device changes state from ready-mode to the active state.

For example, in one or more embodiments of the invention, when input is sensed by the electromagnetic board of an e-flipchart apparatus, a signal is sent to a controller CPU which is running the energy management software to "wake up" some or all the components and put them in "active mode". The same process occurs when a signal is detected via a GUI, touch input, or in a "wake up on LAN" input.

The input detected by the interactive device in Step 504 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the interactive device. Thus, upon detection of an input, a determination is made as to whether the input is a touch input or a gesture input (Step 506). If the detected input is a user gesture, the interactive device may be configured to perform gesture detection or activate a user interface (UI) component (Step 508). For all other input types, an appropriate action is performed by the interactive device (Step 510).

For example, when the detected input is not a touch or gesture input, but rather, is a wireless signal, for example, a press of the button on the digital marker, corresponding external events may be activated (Step 510). Continuing the example, in Step 510, when the input is a Bluetooth signal, the interactive device may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the interactive device. For example, proximity sensors may include ultrasonic sensors or infrared sensors. In yet another embodiment of the invention, when the detected input is a pen stroke using a digital marker or digitizer (i.e., handwritten input), the interactive device may be configured to detect the path of the digital marker tip and convert the motion to a display of simulated ink strokes (Step 508). Accordingly, the specific action performed by the interactive device may vary depending on the type of input received.

When the detection input is a gesture or a touch input, the activated components may display data on the display area (e.g., the virtual canvas), flip a page, zoom into the content displayed, or perform any other suitable action in response to the touch/gesture input. In one or more embodiments of the invention, after performing the action in response to the detection of an input, the interactive device returns to the base state of "ready-mode." In one or more embodiments, in this mode the interactive device to continue to display a virtual canvas without any power used by the bi-stable reflective display component of the apparatus.

Figure 6:
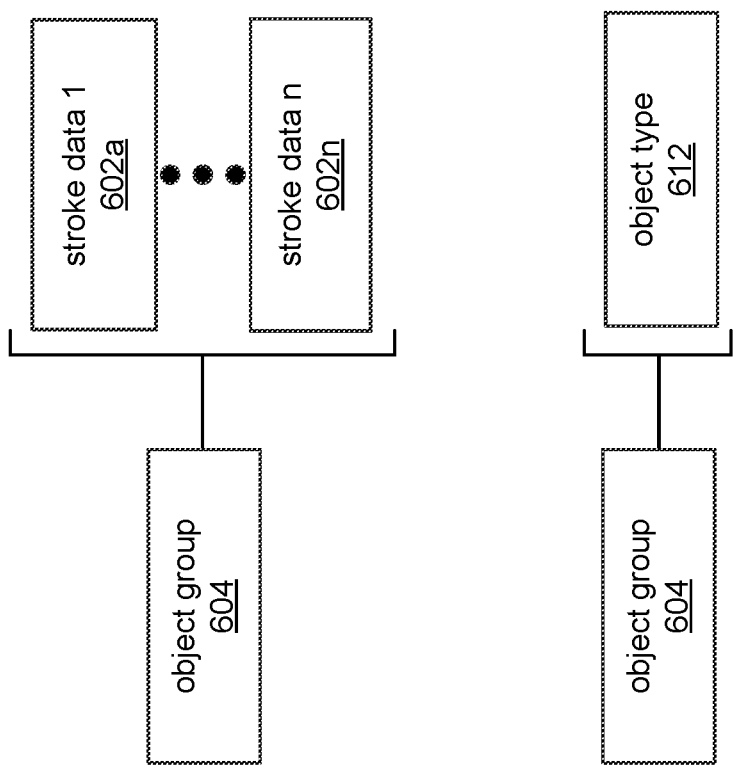
FIG. 6 shows data relationships for an electronic flipchart in accordance with one or more embodiments of the invention.

FIG. 6 shows relationships in accordance with one or more embodiments of the invention. Specifically, FIG. 6 shows the relationship between stroke data (602*a*, 602*n*) generated based on received handwritten input and an object group (604), and the relationship between an object group (604) and an object type (612). Each of these relationships is described below.

As previously discussed, in one or more embodiments of the invention, stroke data (602) is data pertaining to the handwritten input (e.g., a dot, a line, a letter, a drawing, a word, or a series of words) made on the virtual canvas of the interactive display (104), using a digital marker, stylus pen, user touch input, user gesture input, etc.

In one or more embodiments of the invention, the object group (604) is a logical grouping of a particular set of stroke data. For example, an object group (604) may include all of the stroke data that make up a letter, a word, a phrase, a sentence, and/or a paragraph.

In one or more embodiments of the invention, the stroke data that is associated with an object group (604) may be determined using, for example, time and proximity parameters (described below). FIG. 6 shows an object group (604) that includes stroke data 1 (602*a*) through stroke data n (602*n*) ("stroke data 1-*n*"), which is related to stroke input 1 through stroke input n received as handwritten input. In one or more embodiments of the invention, stroke inputs 1-*n* may be any range or group of associated stroke input that the interactive device (104) receives. For example, stroke inputs 1-4 may include four separate strokes (e.g., four parallel lines) or four groups of strokes (e.g., four letters). Further, the object group (604) encompassing stroke data 1-*n* may include a cumulative aggregation of all of the stroke data (602) of stroke inputs 1-*n*. Alternatively, the object group (604) encompassing stroke data 1-*n* may only include a selective aggregation of the stroke data (602*a*, 602*n*) of stroke inputs 1-*n*, based on the continuous classification and re-classification of the strokes as particular object types (612) (discussed below). For example, if a user draws (i.e., provides handwritten input) a letter, stroke data 1-*n* may relate to each and every individual stroke data for the letter. As another example, if a user is in the process of writing a sentence as handwritten input, stroke data 1-*n* may relate only to the last completed word or letter of the sentence Thus, the granularity of the stroke data in an object group may vary depending on the object group that is defined.

In one or more embodiments of the invention, a particular object group (604) may be associated with an object type (612). In one or more embodiments of the invention, the object type (612) may be a letter, a word, a sentence or a paragraph. Those skilled in the art and having the benefit of this Detailed Disclosure will appreciate that the invention is not limited to the aforementioned object types.

In one embodiment of the invention, each individual piece of stroke data (602*a*, 602*n*) may be associated with one or more object groups, where each object group is associated with an object type. For example, consider a scenario in which a user wrote the phrase "Hello World" as handwritten input on a virtual canvas within the tolerance area of a given cell and within a preset the tolerance time, and that there are three object types: letter, word, and sentence. In this example, the stroke data corresponding to the letter "H" is associated with: (i) an object group of object type letter that is associated with all stroke data for letter "H", (ii) an object group of object type word associated with all stroke data corresponding to the word "Hello"; and (iii) an object group of object type sentence associated with all stroke data corresponding to the words "Hello World." In this manner, the stroke data is associated with a set of nested object groups, where each object group has a different level of granularity. In one or more embodiments of the invention, the set of nested object groups may be collectively referred to as the handwritten input and associated with a certain cell of the virtual canvas.

In one embodiment of the invention, each object group is associated with a state. The object group may be in an "open" state or in a "closed state." When an object group is in an "open" state, additional stroke data may be associated with the object group. When an object group is in a "closed" state, additional stroke data may not be associated with the object group.

In one embodiment of the invention, each user may only have one open object group per object type at any given time. For example, a given user may only be associated with one open object group for each of the following types at any one time—letter, word, and sentence. Accordingly, if there are multiple users using the interactive device, then each user may have its own open set of object groups.

Those skilled in the art and having the benefit of this Detailed Disclosure will appreciate that the use of certain parameters that take into consideration both the time and proximity of the stroke input (time and proximity thresholds), allow the stroke input to be classified into object groups in a manner that is consistent with written language norms. By identifying and differentiating between object types in the embodiments described above, the invention facilitates certain formatting and manipulation functions of the handwritten input, without the need to first convert the digital drawings and handwriting into corresponding ASCII, Unicode or other word processor-friendly text. In one or more embodiments of the invention, the interactive device includes functionality to determine and/or be configured to recognize that handwritten input is written in a given language, and cell formatting decisions may change based on the language used.

FIG. 7 and FIG. 8 show flowcharts in accordance with one or more embodiments of the invention. While the various steps in these flowcharts are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

FIG. 7 shows a flowchart for grouping handwritten input (i.e., stroke input) in accordance with one or more embodiments of the invention. More specifically, FIG. 7 shows how certain handwritten input is grouped into either a new or an existing object group(s).

In Step 700, handwritten input is detected on the interactive display. The handwritten input is then converted into stroke data.

In Step 702, a determination is made as to whether the handwritten input is within a proximity threshold of an existing object group(s). In one embodiment of the invention, there may be one or more object groups that are currently in an "open" state (discussed above). The determination related to whether the handwritten input (as defined by the stroke data) is within a proximity threshold may be performed on a per object group basis (if more than one object group is in an "open" state) or may be performed for only one object group of the set of object groups that are currently in an "open" state. As discussed above, the object groups may be associated with a user. In such instances, the determination in Step 702 is only performed on object groups associated with the user that provided the handwritten input to generate the stroke data in Step 700.

In one or more embodiments of the invention, a proximity threshold is a requisite proximity value, based on a distance of the handwritten input (as defined in stroke data) in relation to the distance of existing handwritten input (as defined by corresponding stroke data) associated with an object group. There may be multiple proximity thresholds, which may be based on, among other things, the object type of the existing object group. As previously discussed, an object type is a logical subgrouping of a particular set of stroke input, which may be categorized as a marking, a stroke, a letter, a word, a sentence or a paragraph. An example of multiple proximity thresholds based on object types may include a first requisite proximity value associated with letters, a second requisite proximity value associated with words, a third requisite proximity value associated with sentences, etc. Additionally, one or more proximity thresholds may be defined during the initialization phase based on the selected or detected language, as discussed above. Further, one or more proximity thresholds may be dynamically defined based on certain user-dependent stroke data, such as the average size of the user's handwriting when drawing the strokes.

Continuing with Step 702, if the handwritten input is determined to be within the proximity threshold of the existing object group(s), then Step 704 is performed. In Step 704, a determination is made as to whether the handwritten input (as defined by the stroke data) is within a time threshold of one or more existing object groups. In one embodiment of the invention, the determination of whether stroke data is associated with a given object group may be based solely on the proximity threshold. In such instances, Step 704 is not performed.

In one or more embodiments of the invention, there may be one or more object groups that are currently in an "open" state (discussed above). The determination related to whether the handwritten input is within a time threshold may be performed on a per object group basis (if more than one object group is in an "open" state) or may be performed for only one object group of the set of object groups that are currently in an "open" state. As discussed above, the object groups may be associated with a user. In such instances, the determination in Step 704 is only performed on object groups associated with the user that provided the handwritten input to generate the stroke data in Step 700.

In one or more embodiments of the invention, a time threshold is a requisite time value, based on an amount of time elapsed between when the current handwritten input was drawn (as defined by stroke data) and when the existing handwritten input was drawn, enabling the current stroke input to be grouped into the same object group as the existing stroke input. As with the proximity threshold, there may be multiple time thresholds, which may be based on, among other things, the object type of the stroke input of the existing group or the selected language, as discussed above. Additionally, one or more time thresholds may be statically defined during the initialization phase, or dynamically defined based on certain user-dependent stroke data, such as the average time it takes a user to create certain handwritten inputs.

Continuing with Step 704, if the handwritten input is determined to be within the time threshold of the existing object group(s), after it has also been determined to be within the proximity threshold, then Step 706 is performed.

In Step 706, the stroke data is associated with the existing object group(s) that is currently in an "open" state. An object group may remain in an "open" state as long as the requisite proximity and time thresholds of the object group are met. Otherwise, the object group will be transitioned to a "closed" state. In one or more embodiments of the invention, a closed object group may be reopened in accordance with one or more embodiments of the invention. In one or more embodiments of the invention, if there are multiple object groups in an "open" state then the stroke data may be associated with multiple object groups. For example, consider a scenario in which the user has written on a virtual canvas of an interactive device "Wor" and then subsequently writes the stroke data corresponding to the letter "l". In this scenario, the stroke data corresponding to letter "l" may be associated with an object group of object type letter, an object group of object type word (which also includes stroke data corresponding to the "W", "o", and "r") and an object group of object type sentence (which also includes stroke data corresponding to "W", "o", and "r").

In Step 708, upon associating the stroke data with the existing open object group(s), the timer(s) for the existing open object group(s) is set. In one or more embodiments of the invention, the timer(s) for the existing object group is used in determining whether the existing object group should continue to remain open or be closed. To make this determination, the timer(s) takes into consideration the relevant stroke data, object type(s) and time and proximity thresholds associated with the object group. After the timer expires for an existing object group, the object group is closed. If there are multiple open object groups (i.e., object groups with a state of "open"), then there may be a separate timer for each of the object groups. Further, the duration of the timer for each of the object groups may be the same or different. For example, the object group of object type word may have a shorter timer than an object group of object type sentence.

Turning back to Step 702, where a determination is made as to whether the handwritten input (as defined by the stroke data) is within a requisite proximity threshold of an existing object group(s). If the handwritten input is not within the requisite proximity threshold, then the handwritten input is not added to the existing group(s). That is, when the current handwritten input is detected too far away from the existing stroke previously made, even if the current handwritten input is made within a required time threshold, the current stroke input is not added to the existing open group. Instead, the existing group is closed and the process moves to Step 710.

In one embodiment of the invention, if there are multiple open object groups then the determination in Step 702 is performed on a per object group basis and only open object groups for which the proximity threshold is exceed are closed.

Continuing with the discussion of FIG. 7, in Step 710, a new object group(s) is created to accommodate the current handwritten input (or, more specifically, the stroke data associated with the current handwritten input). Step 710 may include creating one or more new object groups. For example, consider a scenario in which the user has handwritten the following on an interactive device: "Hello" and the current stroke input is a first stroke corresponding to a portion of the letter "W." Further assume that the distance between the first stroke corresponding to the letter "W" and the letter "o" is: (i) greater than a proximity threshold for an object group of object type letter, (ii) greater than a proximity threshold for an object group of object type word, and (iii) less than a proximity threshold for an object group of object type sentence. In this example, an object group of object type letter and the object group of object type word are closed but the object group of object type sentence remains open. Further, in step 710, a new object of object type letter and a new object of object type word are created.

In Step 712, the stroke data is associated with the new object group(s). Continuing with the example described in Step 710, the stroke data is associated with the new object of object type letter, the new object of object type word, and an existing object of object type sentence.

In Step 714, the timer(s) for the new open object group(s) is set. The new object group(s) remains open as long as the timer does not expire. Further, in Step 714 if there are also existing object groups with which the stroke data is associated, then the timers associated with the existing object groups are also set. Continuing with the example described in Step 712, a timer is set for the new object of object type letter, for the new object of object type word, and for an existing object of object type sentence.

FIG. 8 shows a flowchart describing a method for receiving handwritten input and applying a cell formatting decision to the handwritten input in accordance with one or more embodiments of the invention.

In Step 800, handwritten input is received. In one or more embodiments of the invention, handwritten input is provided (e.g., by a user) to an interactive display via handwriting on a virtual canvas that is displayed on the interactive display. In one or more embodiments of the invention, the handwritten input may be received in any manner (e.g., touch input, gesture input, digital marker, stylus pen, etc.).

In one or more embodiments of the invention, receipt of the handwritten input begins when an interactive device detects that the handwritten input has begun, and continues until it is determined that the handwritten input has ended. For example, the handwritten input may be the user input received by an interactive display within certain time and/or location/proximity thresholds. In one or more embodiments of the invention, the handwritten input begins when a user provides a first indication, and ends when the user provides a second indication. For example, the interactive display may include one or more visual elements that allow the user to "start writing" and then to subsequently "stop writing". As another example, the user may enter handwritten input using a stylus that includes a button available to the user that includes functionality to communicate to the interactive device the beginning and/or end of a given unit of handwritten input. In one or more embodiments of the invention, handwritten input begins at the opening of one or more object groups and ends when the one or more object groups are closed.

In one or more embodiments of the invention, the handwritten input is stored as stroke data. The stroke data may be grouped into one or more object groups, each of which may have an associated object type. In one or more embodiments of the invention, the handwritten input is stored as stroke data that includes a sample of the handwritten input at certain intervals, and may include location data and a timestamp.

In Step 802, the handwritten input is associated with a cell of a virtual canvas. For example, the one or more object groups corresponding to the handwritten input may be associated with a given cell of a virtual canvas. In one or more embodiments of the invention, the handwritten input is associated with a cell in which the handwritten input began (e.g., the cell in which the user began writing). In other embodiments of the invention, the handwritten input is associated with a cell in which the majority of the handwritten input exists. A majority may be any portion of the handwritten input greater than fifty percent, or may be any user configurable portion of the handwritten input. In one or more embodiments of the invention, the handwritten input may be associated with the cell that includes more of the handwritten input than other cells of the virtual canvas. In one or more embodiments of the invention, the handwritten input may be associated with a cell selected by a user of the interactive device. In one or more embodiments of the invention, the association between the cell and the handwritten input may be included in the virtual canvas file.

In Step 804, a determination is made about whether any portion of the handwritten input exists outside of the cell with which the handwritten input is associated. For example, in FIG. 3, the handwritten input "My name is joy" has a portion (i.e., the lower part of the "y", "j", and "y") outside of cell A1 (302). In one or more embodiments of the invention, if none of the handwritten input is outside of the cell (i.e., all of the handwritten input is within the cell), then the process ends. If, on the other hand, a portion of the handwritten input is outside the cell, then the process proceeds to Step 806.

In Step 806, a determination is made whether any portion of the handwritten input is outside of the tolerance area of the cell associated with the handwritten input in Step 802. For example, while handwritten input may begin in a cell, a user may continue writing beyond the boundaries of the tolerance area. In one or more embodiments of the invention, if some portion of the handwritten input is outside of the tolerance area, the process proceeds to Step 808. If, on the other hand, none of the handwritten input is outside the tolerance area, then the process proceeds to Step 810.

In Step 808, the portion of the handwritten input outside the tolerance area is cropped. In one or more embodiments of the invention, cropping the handwritten input may include any method for not displaying on the virtual canvas the portion of the handwritten input outside the tolerance area. For example, once the handwritten input has ended, the portion outside the tolerance area may be erased. As another example, once the handwritten input has been associated with a cell, then the interactive display may actively stop accepting handwritten input that is outside the tolerance area of the cell until the handwritten input has ended.

In Step 810, one or more cell formatting decisions are applied to the handwritten input portion that is within the tolerance area of the virtual canvas cell associated with the handwritten input. In one or more embodiments of the invention, applying a cell formatting decision includes adjusting the appearance (e.g., display) of the handwritten input on the virtual canvas of the interactive display. For example, as discussed above in the description of FIG. 1A, the cell size may be increased to encompass the handwritten input, the size of the handwritten input may be reduced such that the handwritten input is within the boundaries of the cell, one or more visual properties of the handwritten input may be modified, the handwritten input may be divided and portions moved relative to other portions of the handwritten input (e.g., a second portion moved below a first portion), portions of the handwritten input may be hidden (i.e., not displayed), etc. In one or more embodiments of the invention, if the handwritten input is at least partially hidden, the interactive display may include functionality to display the hidden portion automatically, or upon request. For example, a user may provide an indication (e.g., via a user input element of the displayed virtual canvas, via a stylus button, etc.) that the interactive display should display the hidden portion of the handwritten input of a given cell. As another example, the interactive display may be configured to display the hidden portion of the handwritten input when the user interacts with the cell or a visual element displayed in or near the cell.

In one or more embodiments of the invention, though not shown in FIG. 8, the interactive display may be configured to receive a request in any manner from a user to move the handwritten input to a different cell of the virtual canvas. In such embodiments of the invention, the cell to which the handwritten input is moved may have the same one or more cell formatting decisions applied as were applied to the cell the previously included the handwritten input. Additionally, in one or more embodiments of the invention, the interactive display may include functionality to receive an indication that a user wants to edit handwritten input to which a cell formatting decision was previously applied. In such embodiments of the inventions, the same cell formatting decisions made to the original input may be made to the edited handwritten input.

FIGS. 9-13 show various examples in accordance with one or more embodiments of the invention. The following examples are for explanatory purposes only and not intended to limit the scope of the invention.

Figure 9:
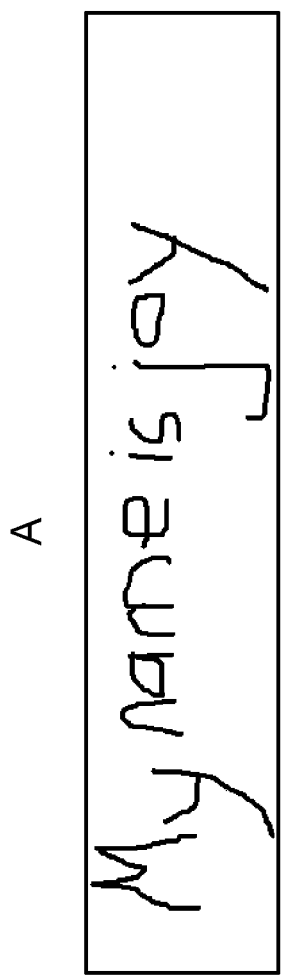
FIGS. 9-13 show examples in accordance with one or more embodiments of the invention.
Figure 10:
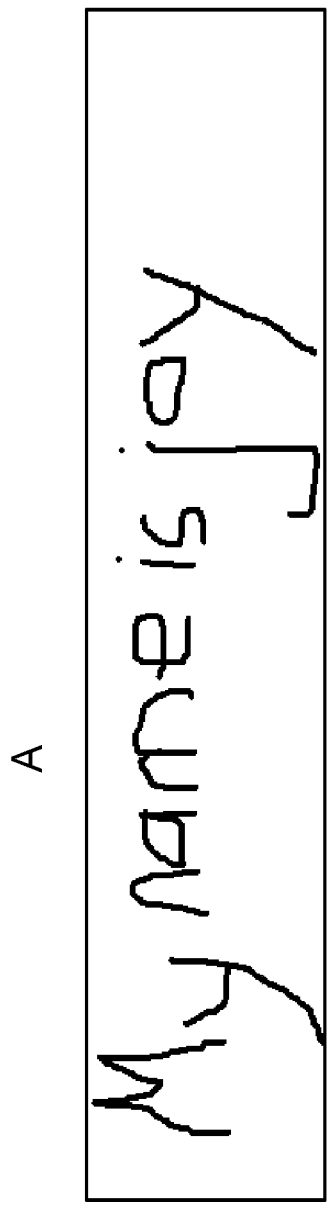
Figure 11:
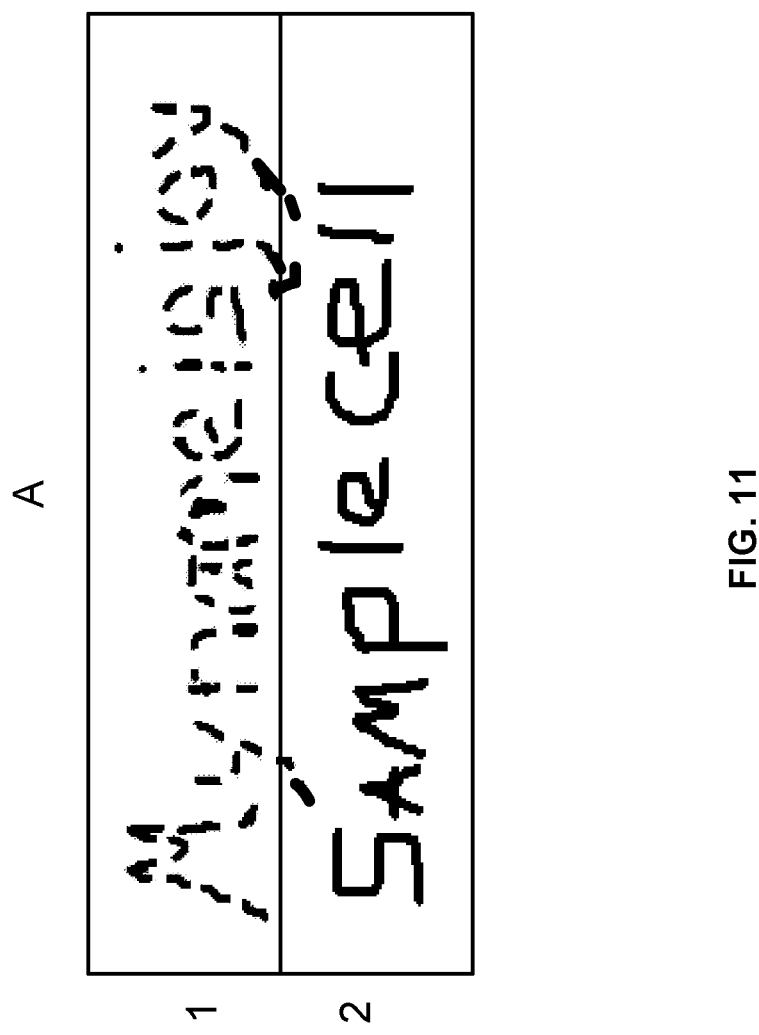

The examples provided in FIGS. 9-11 make use of the handwritten input previous discussed in the description of FIG. 3, above. Referring to FIG. 3, consider a scenario in which the handwritten input "My name is joy" has been received by an interactive display, and falls partially outside cell A1 but entirely within the tolerance area of cell A1. In such a scenario, one possible cell formatting decision, as shown in FIG. 9, is to reduce the size of the handwritten input such that the handwritten input falls entirely within the original boundaries of cell A1. In one or more embodiments of the invention, the size reduction of the handwritten input is proportional, such that the original proportions of the handwritten input are relatively maintained. In other embodiments of the invention, one or more aspects of the handwritten input may be altered to fit the handwritten input within the cell. For example, though not shown in FIG. 9, the handwritten input may be reduced in one direction (e.g., height) while extended in another direction (e.g., length).

FIG. 10 shows another possible cell formatting decision applied to handwritten input. Specifically, as shown in FIG. 10, one possible cell formatting decision that may be made is to adjust the size of the cell. For example, the size of cell A1 shown in FIG. 10 is increased such that the handwritten input falls entirely within the cell A1. Adjusting the size of a cell may or may not require a size adjustment of one or more additional cells of the virtual canvas.

FIG. 11 shows another possible cell formatting decision applied to the displayed handwritten input. Specifically, as shown on FIG. 11, one possible cell formatting decision that may be made is to display the written text as it was written without modifying the size of the written text or the size of the cell, but to allow the written text associated with a given cell to be displayed partially inside the cell, and to display any other portion of the handwritten input in one or more adjacent cells. For example, as shown in FIG. 11, the handwritten input "My name is joy" is associated with cell A1, but partially displayed in cell A2.

FIG. 11 also shows another possible cell formatting decision applied to handwritten input. Specifically, as shown in FIG. 11, one possible cell formatting decision that may be made is to adjust a visual property of the handwritten input relative to handwritten input of another cell. For example, as shown in FIG. 11, the cell A1 has been subject to a cell formatting decision such that the handwritten input associated with cell A1 is modified to have a dashed-line appearance. In one or more embodiments of the invention, the dashed-line appearance allows for the handwritten input associated with cell A1 (i.e., "My name is joy") to be differentiated from the handwritten input associated with the adjacent cell A2 (i.e., "Sample cell"). In one or more embodiments of the invention, the differentiation allows a user to distinguish handwritten input associated with a given cell even though it appears partially in a different cell of the virtual canvas.

Figure 12A:
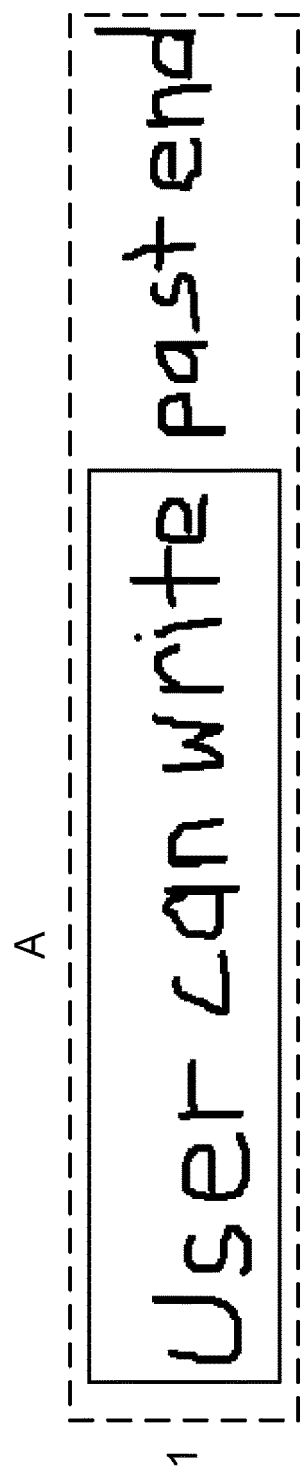
Figure 12B:
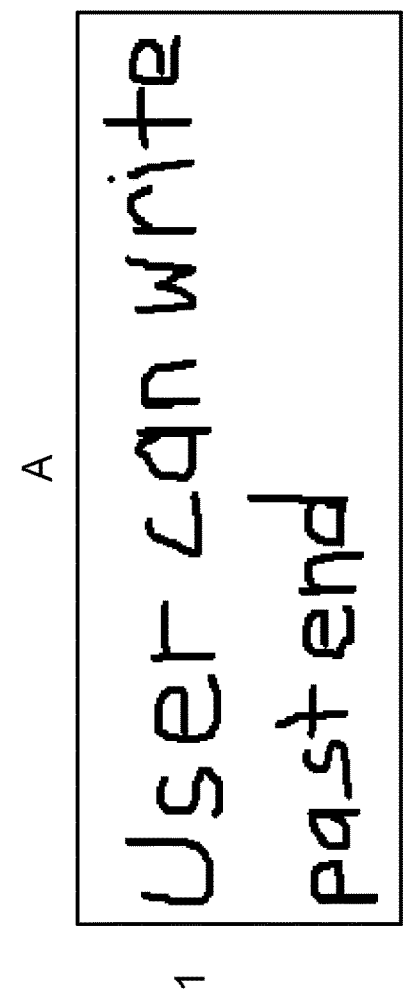
Figure 12C:
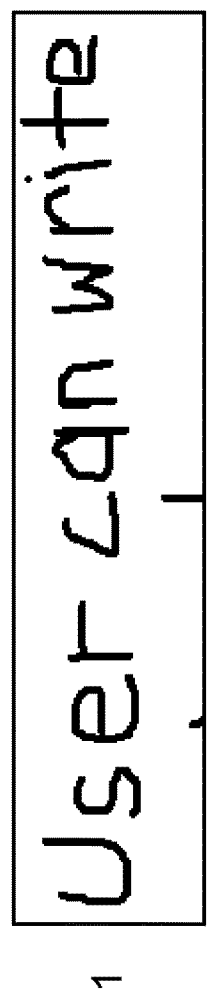

FIGS. 12*a*-12*c* show examples of possible cell formatting decisions that involve dividing the handwritten input into portions and moving at least one of the portions. FIG. 12A shows a cell and corresponding tolerance area. A user sent to the interactive display via a stylus button that handwritten input began. Next, the user handwrote "User can write past end", which extends beyond the boundaries of the cell, but not corresponding tolerance area (i.e., "past end" is to the right of the cell boundary). In one or more embodiments of the invention, once the time and proximity limits are reached, a determination is made that the handwritten input has ended. In other embodiments of our invention, once the user finishes writing, the user sends another indication, via a stylus button, that the handwritten input has ended. In this example, the handwritten input is associated with cell A1 because the handwritten input began with the word "User" in cell A1. Once the handwritten input has been processed as nested object groups for the letters, words, and sentence, and the object groups have been associated with the cell, a cell formatting decision is applied. FIG. 12*b* shows a cell formatting decision to divide the handwritten input into two portions, one portion within the cell (i.e., "User can write") and one outside the cell (i.e., "past end"). As shown in FIG. 12*b*, the cell formatting decision causes the second portion "past end" to be moved below "User can write", and the height of cell A1 is extended such that all of the handwritten input is displayed. FIG. 12*c* shows a cell formatting decision that includes hiding the second portion "past end" after moving it below the first portion "User can write".

Figure 13:
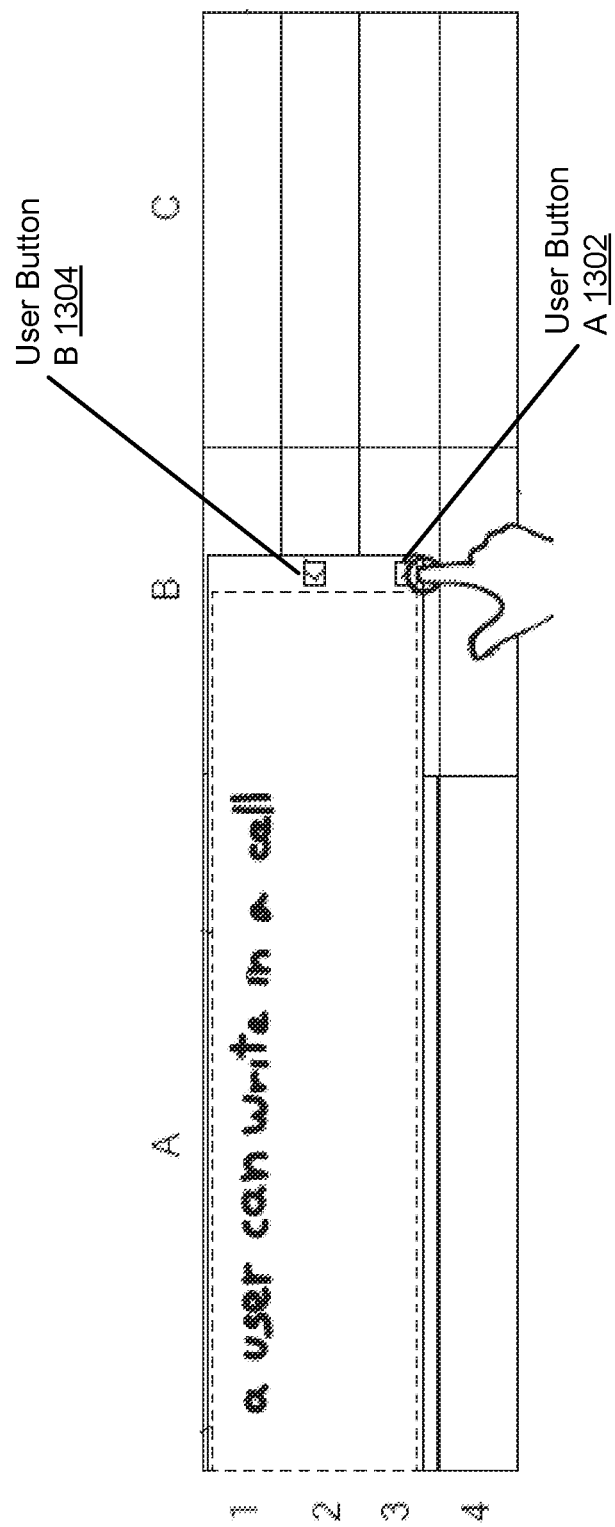

FIG. 13 shows an example in which the virtual canvas includes the handwritten input User can write in a cell, as well as visual elements that allow a user to hide and/or display the handwritten input. Specifically, the exemplary virtual canvas of FIG. 13 includes user button A (1302) and user button B (1304). User button B (1304) may be used to indicate that the handwritten input to be associated with cell A1 has ended, and additionally that the text outside the cell should be hidden. Once the text has been hidden (not shown), the other user button, (i.e., user button A (1302) is still displayed next to the cell A1, and a user may re-expand the cell to display the portion "past end", edit the portion, etc. using user button A (1302).

Figure 14:
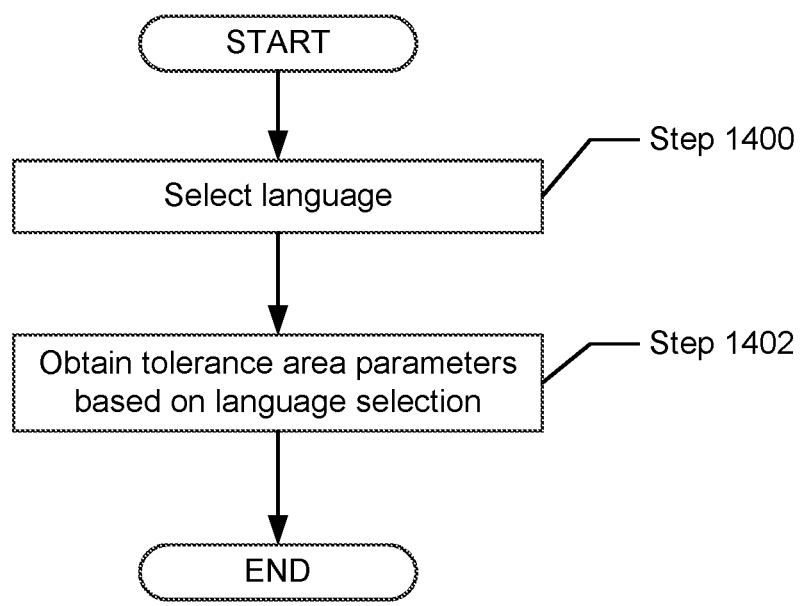
FIG. 14 shows a flowchart in accordance with one or more embodiments of the invention.

FIG. 14 shows a flowchart describing a method for selecting a language to obtain tolerance area parameters in accordance with one or more embodiments of the invention.

In Step 1400, the interactive device detects the selection of a particular language to be used by the system, such as English, Arabic, or Mandarin Chinese, Hebrew, Japanese, etc. In one or more embodiments of the invention, a user of the interactive device selects the language. In one or more embodiments of the invention, the language is configurable for the interactive device. In one or more embodiments of the invention, the interactive device includes functionality to detect the language based on characteristics of the handwritten input, such as the direction text is written.

In Step 1402, tolerance area parameters are obtained based at least partially on the language selection of Step 1400. For example, if the selected language is English, then, the tolerance area to the right and to the bottom of the cell might be larger than the tolerance area to the left and top of the cell as the direction of the English writing is from left to right and up to down. As another example, if the selected language is Hebrew, then, the tolerance area to the left and to the bottom of the cell might be larger than the tolerance area to the right and top of the cell as the direction of the Hebrew writing is from right to left and up to down. Other examples exist for other languages.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this Detailed Disclosure, will appreciate that other embodiments can be devised which do not depart from the scope of the invention as disclosed herein. Accordingly, the scope of the invention should be limited only by the attached claims.

What is claimed is:

1. A method for formatting handwritten virtual ink, the method comprising:
   receiving handwritten input on an interactive display;
   associating a cell of a virtual canvas displayed on the interactive display with the handwritten input;
   making a first determination that the handwritten input does not fit within the cell, wherein a width of the cell is unchanged; and
   applying a cell formatting decision, based on the first determination, to the handwritten input, comprising:
      dividing the handwritten input into a first portion inside the cell, and a second portion outside the cell, wherein a width of the first portion and a width of the second portion are each less than the width of the cell;
      repositioning, within the cell, the second portion below the first portion; and
      hiding at least a part of the second portion, wherein the part of the second portion does not fit within a height of the cell.

2. The method of claim 1, wherein applying the cell formatting decision further comprises increasing a size of the cell to encompass a third portion of the handwritten input outside the cell.

3. The method of claim 1, wherein applying the cell formatting decision further comprises reducing a size of a third portion of the handwritten input to fit within the cell.

4. The method of claim 1, further comprising:
   extending the height of the cell to accommodate displaying the second portion.

5. The method of claim 1, wherein applying the cell formatting decision further comprises:
   identifying a third portion of the handwritten input that is within the cell;
   displaying the third portion within the cell; and
   hiding a remainder of the handwritten input.

6. The method of claim 5, further comprising:
   receiving, after hiding the remainder of the handwritten input, an indication that the remainder should be displayed; and
   displaying, in response to the indication, the remainder of the handwritten input on the virtual canvas,
   wherein after displaying the remainder of the handwritten input, the interactive display is configured to accept an edit to the handwritten input.

7. The method of claim 1, further comprising:
   performing a detection that a second cell adjacent to the cell includes second handwritten input; and based on the detection, adjusting a visual property of the handwritten input to differentiate the handwritten input from the second handwritten input.

8. The method of claim 1, further comprising:
receiving a request to move the handwritten input to a second cell;
moving, in response to the request, the handwritten input to the second cell; and
applying the cell formatting decision to the second cell.

9. The method of claim 1, further comprising:
before receiving the handwritten input, receiving a first indication that the handwritten input will start; and
after receiving the handwritten input, receiving a second indication that the handwritten input has ended and is ready to be associated with the cell.

10. The method of claim 1, further comprising:
while receiving the handwritten input, receiving a user input, via a user interface element; and
based on the user input and before applying the cell formatting decision, adjusting the width of the cell or the height of the cell to encompass the handwritten input.

11. The method of claim 1, wherein associating the cell with the handwritten input comprises making a determination that a majority of the handwritten input is within the cell.

12. The method of claim 1, wherein associating the cell with the handwritten input comprises making a determination that the handwritten input begins within the cell.

13. The method of claim 1, further comprising:
processing the handwritten input, before associating the cell with the handwritten input, to obtain an object group,
wherein associating the cell with the handwritten input comprises associating the cell with the object group.

14. A non-transitory computer readable medium comprising instructions, which when executed by a processor, performs a method for formatting handwritten virtual ink, the method comprising:
receiving handwritten input on an interactive display;
associating a cell of a virtual canvas displayed on the interactive display with the handwritten input;
making a first determination that the handwritten input does not fit within the cell, wherein a width of the cell is unchanged; and
applying a cell formatting decision, based on the first determination, to the handwritten input, comprising:
dividing the handwritten input into a first portion inside the cell, and a second portion outside the cell, wherein a width of the first portion and a width of the second portion are each less than the width of the cell;
repositioning, within the cell, the second portion below the first portion; and
hiding at least a part of the second portion, wherein the part of the second portion does not fit within a height of the cell.

15. The non-transitory computer readable medium of claim 14, wherein applying the cell formatting decision further comprises increasing a size of the cell to encompass a third portion of the handwritten input outside the cell.

16. The non-transitory computer readable medium of claim 14, wherein applying the cell formatting decision further comprises reducing a size of a third portion of the handwritten input to fit within the cell.

17. The non-transitory computer readable medium of claim 14, the method further comprising:
extending the height of the cell to accommodate displaying the second portion.

18. The non-transitory computer readable medium of claim 14, wherein applying the cell formatting decision further comprises:
identifying a third portion of the handwritten input that is within the cell;
displaying the third portion within the cell; and
hiding a remainder of the handwritten input.

19. The non-transitory computer readable medium of claim 18, wherein the method further comprises:
receiving, after hiding the remainder of the handwritten input, an indication that the remainder should be displayed; and
displaying, in response to the indication, the remainder of the handwritten input on the virtual canvas,
wherein after displaying the remainder of the handwritten input, the interactive display is configured to accept an edit to the handwritten input.

20. The non-transitory computer readable medium of claim 14, the method further comprising:
performing a detection that a second cell adjacent to the cell includes second handwritten input; and
based on the detection, adjusting a visual property of the handwritten input to differentiate the handwritten input from the second handwritten input.

21. The non-transitory computer readable medium of claim 14, the method further comprising:
receiving a request to move the handwritten input to a second cell;
moving, in response to the request, the handwritten input to the second cell; and
applying the cell formatting decision to the second cell.

22. The non-transitory computer readable medium of claim 14, the method further comprising:
before receiving the handwritten input, receiving a first indication that the handwritten input will start; and
after receiving the handwritten input, receiving a second indication that the handwritten input has ended and is ready to be associated with the cell.

23. The non-transitory computer readable medium of claim 14, the method further comprising:
while receiving the handwritten input, receiving a user input, via a user interface element; and
based on the user input and before applying the cell formatting decision, adjusting the width of the cell or the height of the cell to encompass the handwritten input.

24. The non-transitory computer readable medium of claim 14, wherein associating the cell with the handwritten input comprises making a determination that a majority of the handwritten input is within the cell.

25. The non-transitory computer readable medium of claim 14, wherein associating the cell with the handwritten input comprises making a determination that the handwritten input begins within the cell.

26. The non-transitory computer readable medium of claim 14, the method further comprising:
processing the handwritten input, before associating the cell with the handwritten input, to obtain an object group,
wherein associating the cell with the handwritten input comprises associating the cell with the object group.

27. An interactive display, comprising:
memory; and a processor, wherein the processor is configured to perform a method for formatting handwritten virtual ink, the method comprising:
receiving handwritten input on the interactive display;
associating a cell of a virtual canvas displayed on the interactive display with the handwritten input;
making a first determination that the handwritten input does not fit within the cell, wherein a width of the cell is unchanged; and
applying a cell formatting decision, based on the first determination, to the handwritten input, comprising:
dividing the handwritten input into a first portion inside the cell, and a second portion outside the cell, wherein a width of the first portion and a width of the second portion are each less than the width of the cell;
repositioning, within the cell, the second portion below the first portion; and
hiding at least a part of the second portion, wherein the part of the second portion does not fit within a height of the cell.

28. The interactive display of claim 27, wherein the method further comprising:
receiving a request to move the handwritten input to a second cell;
moving, in response to the request, the handwritten input to the second cell; and
applying the cell formatting decision to the second cell.

29. The interactive display of claim 27, wherein the method further comprising:
before receiving the handwritten input, receiving a first indication that the handwritten input will start; and
after receiving the handwritten input, receiving a second indication that the handwritten input has ended and is ready to be associated with the cell.

30. The interactive display of claim 27, wherein the method further comprising:
while receiving the handwritten input, receiving a user input, via a user interface element; and
based on the user input and before applying the cell formatting decision, adjusting the width of the cell or the height of the cell to encompass the handwritten input.

31. The interactive display of claim 27, wherein associating the cell with the handwritten input comprises making a determination that a majority of the handwritten input is within the cell.

* * * * *